ANNULAR COMBUSTION CHAMBERS FOR GAS TURBINE ENGINES

Filed Aug. 4, 1965 6 Sheets-Sheet 1

6a

6b

24b 4
26
6c 24c
26
26
21
5
20
25

4
6
24

21
5
20
25

ANNULAR COMBUSTION CHAMBERS FOR GAS TURBINE ENGINES

Filed Aug. 4, 1965 6 Sheets-Sheet 3

4
6
21
5
25
16
28
20
11
9
10
12

4
21
5
6c
26
25
16
28
20
6c
26
11
9
10
12

United States Patent Office 3,304,713

Patented Feb. 21, 1967

1

3,304,713
ANNULAR COMBUSTION CHAMBERS FOR GAS TURBINE ENGINES

Joseph Szydlowski, Usines Turbomeca, Bordes, France

Filed Aug. 4, 1965, Ser. No. 477,184
Claims priority, application France, Aug. 14, 1964, 985,179, Patent 1,419,665
7 Claims. (Cl. 60—39.65)

In rotary fuel injection annular combustion chambers, particularly of the L-shaped type, used in gas turbine engines and comprising, in a common casing positioned between the compressor and the turbine, an outer wall and an inner wall bounding gas combustion and dilution spaces, the feed air must pass through the stream of hot gas in the dilution space in order to reach the cavity within said inner wall. The air is accordingly conveyed into this inner cavity through the hollow guide vanes of the first stage of the turbine and, in addition to its supply function, it must cool these hollow vanes. In view of the necessary cross-sections, such an arrangement consequently calls for a generous dimensioning of the hollow guide vanes which, as a result, become vary mush longer than they would have been had the internal cavity referred to been supplied differently.

In accordance with the present invention, in order to obtain a considerable lengthening of the combustion chamber by reducing the length of the hollow guide vanes of the first turbine stage, the air into the internal cavity bounded by the inner wall of the combustion chamber is supplied through radial air ducts which extend from the outer wall of the chamber and open out opposite holes formed in the inner wall of the chamber, there being but an infinitesimal loss of pressure which thus ensures substantially equal pressures about said outer wall and within the cavity bounded by said inner wall.

Such an arrangement affords the following advantages:

(a) A considerable lengthening of the combustion chamber, favorable to improved gas dilution, is obtained for a given overall size, due to the reduced length of the turbine guide vanes.

(b) Obtainment of the required gas temperature distribution ahead of the turbine is facilitated.

(c) The supplying of the cavity formed by the inner wall is improved.

(d) It lends itself readily to alternative embodiments that may be required to ensure optimum combustion in each particular case.

In order not to impair the flow of hot gas through the combustion chamber and ensure the best possible capacity to withstand heat for the air ducts, in view of the radial disposition thereof, said ducts have a tapering cross-section from the outer wall to the inner wall of the combustion chamber. This tapering section of the ducts from their inlets to their outlets has the added advantage of improving the filling of these ducts and of increasing the velocity of the air flowing therethrough, thereby assisting their cooling. The inner wall of the chamber is provided with an internal diffuser opposite each air duct, the terminal cross-section of which is substantially equal to the inlet cross-section of said ducts whereby to restore in the internal cavity of said inner wall a pressure as nearly equal as possible to that prevailing about the outer wall.

In this constructional form it is possible to cool the hollow guide vanes of the turbine without lengthening them unduly since the amount of air needed for the cooling is very small in relation to the air flow which was heretofore passed through such vanes, as this flow was not only required to supply the chamber through the inner wall thereof but also to cool the hollow vanes. Moreover, a judicious design and positioning of the air

2 ducts to suit individual applications will enable the desired degree of dilution and temperature distribution to be obtained.

In accordance with first preferred form of embodiment, all the air ducts terminate at the inner wall of the chamber and supply the internal cavity thereof. If necessary, the ducts may be formed with holes along their length, through which may flow part of the dilution air, with the remainder of this air being admitted into the chamber through holes or like openings formed on both the outer and inner wall of said chamber.

In accordance with a second preferred embodiment of the invention, only a certain number of the air ducts extend up to the inner wall of the combustion chamber for supplying its internal cavity, while other shorter ducts convey the dilution air into the combustion chamber through the holes or like openings formed in said inner and outer walls. In this specific case the ducts for supplying the internal cavity of the inner wall may be devoid of holes.

The description which follows with reference to the accompanying nonlimitative exemplary drawings will give a clear understanding of how the invention can be carried into practice.

In the drawings:

FIG. 6 is a partial perspective view of the subject combustion chamber of the invention equipped with ducts according to the first form of embodiment referred to;

FIGS. 7 and 8 are partial perspective views of subject combustion chambers of the invention equipped with air ducts according to the second form of embodiment referred to;

Figure 1:
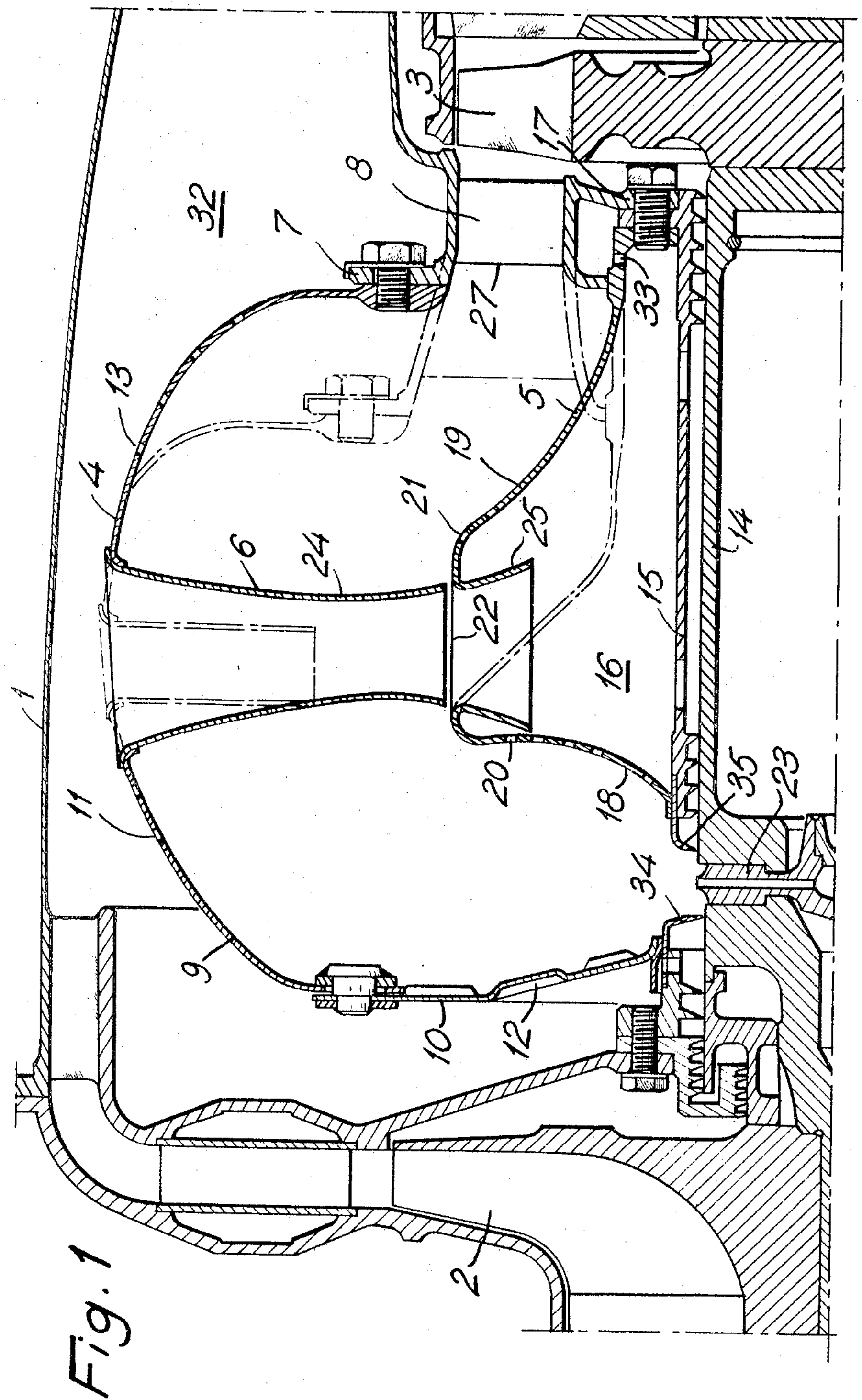
FIG. 1 is a radial half-sectional view of a combustion chamber according to the invention, the outline of a conventional annular combustion chamber with rotary fuel injection being drawn in dot-dash lines.

Reference is first made to the form of embodiment shown in FIG. 1, in which the combustion chamber contained in the turbine casing 1 is positioned between the compressor 2 and the turbine 3. Said chamber comprises an outer wall 4, an inner wall 5, and air ducts 6. Through its rear portion the outer wall 4 is assembled to the outer ring 7 of the turbine distributor 8; its swirl plate 9 and its mixer 10 are formed with sets of holes 11, 12 and 13 through which part of the combustion and dilution air is admitted into the chamber.

The inner wall 5 surrounds the turbine shaft 14 after the labyrinth seal 15 has been fitted and bounds an internal cavity 16; it is joined to the inner ring 17 of the turbine distributor 8; its swirl plate 18 and rear portion 19 are formed with sets of holes 20 and 21 through which the combustion air and the complementary dilution air are admitted into the chamber. The air ducts 6 are welded to the outer wall and their free ends open lipped opposite lipped holes 22 formed in the inner wall, these holes are provided with diffusers 25 through which flow the air conveyed by the air ducts 6. When the combustion chamber is cold, a gap sufficient to accommodate the expansion which takes place in operation is provided between the ends of the ducts 6 and the outer surface of the combustion chamber wall 5.

As is well known in annular combustion chambers of this type, liquid fuel is supplied by means of an injection wheel 23 to which the fuel is fed through a hollow shaft connected to any convenient supply source.

In an alternative constructional form, the lower end of each air duct 6 can be either driven into suitable openings formed in the inner wall 5, or be engaged in the holes 22 thereof. The latter form of embodiment implies that the welding of the air ducts 6 to the outer wall 4 will constitute the ultimate assembly operation.

Figure 2:
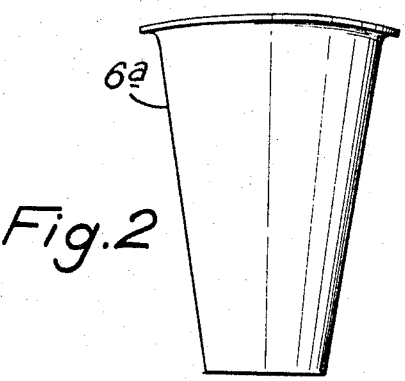
FIGS. 2 through 5 illustrate alternative profiles for radial air ducts.
Figure 3:
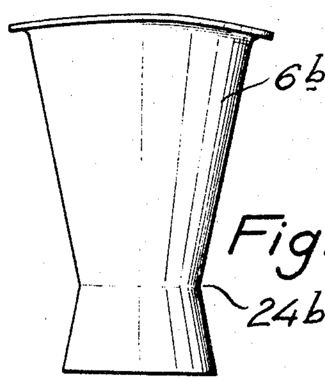
Figure 4:
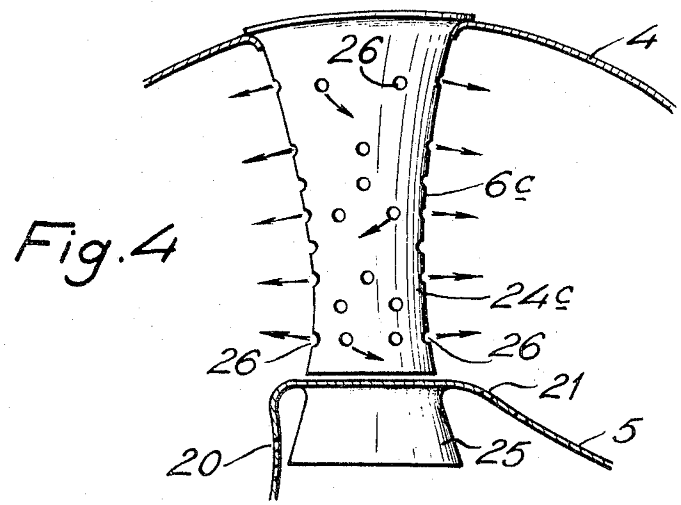
Figure 5:
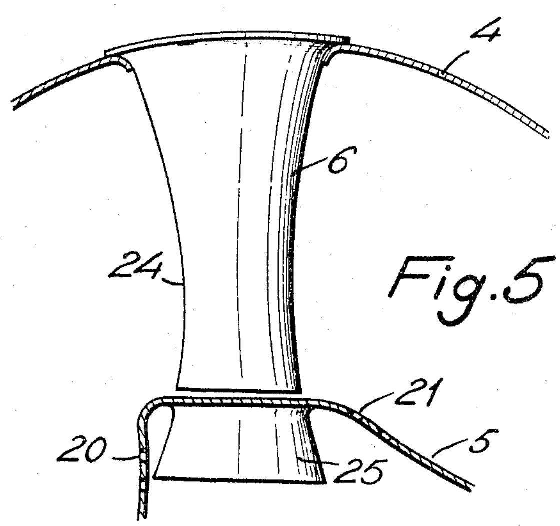

The air ducts 6 are frusto-conical in longitudinal section (duct **6*a* of FIG. 2), or preferably venturi-shaped (ducts 6*b*, 6*c* and 6 in FIGS. 3 to 5) whereby to ensure their complete filling without separation of the stream lines, as well as progressive acceleration of the latter. For the same reasons, and in order also to provide an adequate passageway in the chamber for the combustion gas, said ducts have a markedly oblate elliptical cross-section with the major axis parallel to the turbine shaft 14. The minor axes of the successive elliptical cross-sections decrease in length from the outer wall 4 up to the inner wall 5 in the case of frusto-conical ducts, or, when a venturi shape is adopted, decrease up to the venturi throat 24*b*, 24*c* or 24 (FIGS. 3 to 5), and then increase up to the inner wall 5. The latter arrangement calls for locating the throat at a fairly short distance from the inner wall, with the divergent section of the venturi being extended into the internal cavity 16 by the diffuser 25** (see FIGS. 1, 4 and 5).

Preferably, the terminal inner cross-section of the diffuser 25 is substantially equal to the inlet section of the air ducts 6 whereby a pressure as close as possible to that prevailing about the outer wall 4 is restored in the internal cavity 16. Said diffuser may be welded with advantage to the wall 5 at the edge of the hole 22.

Further, holes 26 (see FIG. 4) for letting through part of the dilution air may be formed in the leading edges, the trailing edges and the sides of the air ducts 6. The distribution of these holes 26, especially those at the trailing edge, can be used to affect the temperature distribution ahead of the vanes 27 of turbine distributor 8.

Figure 6:
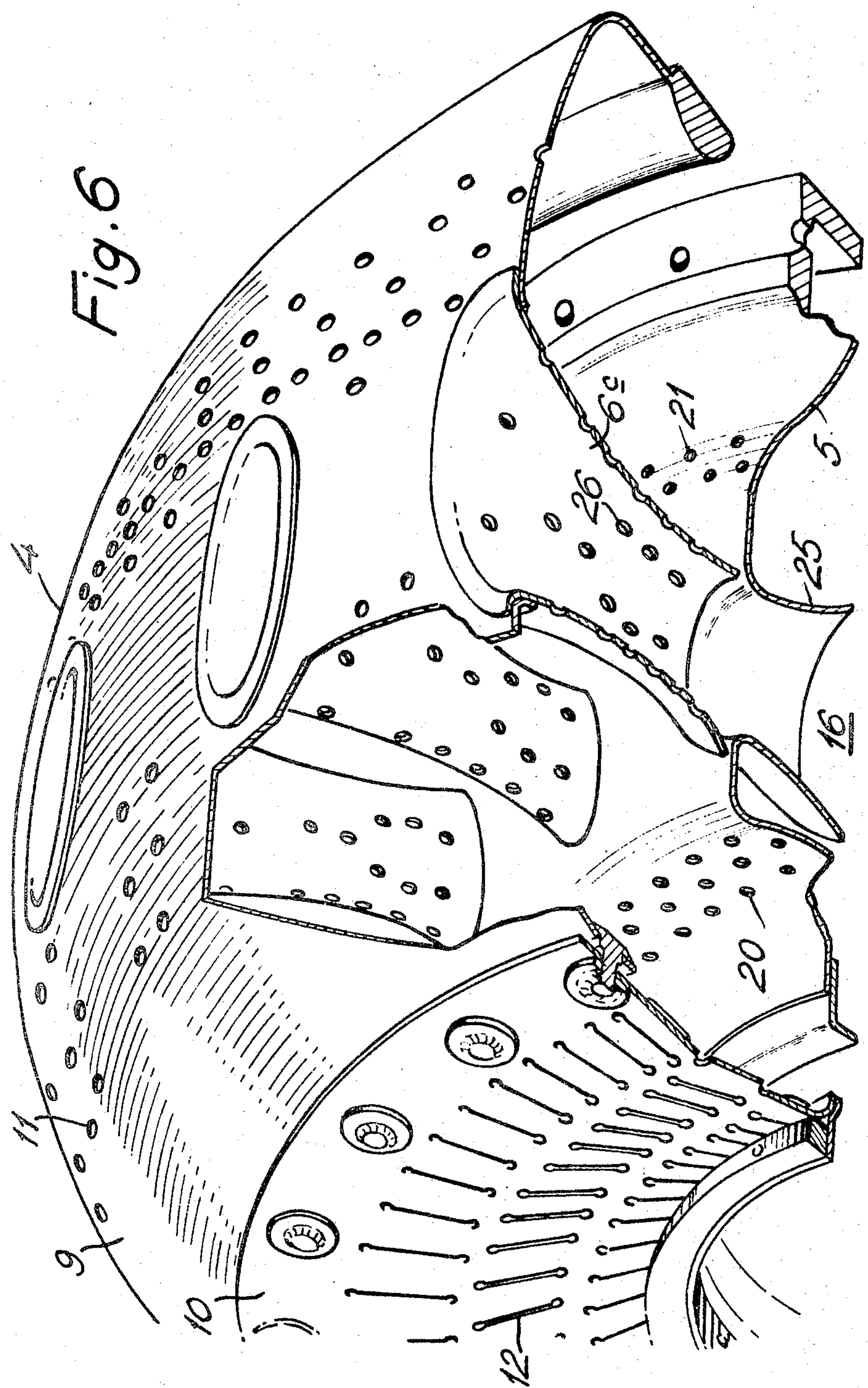
Figure 7:
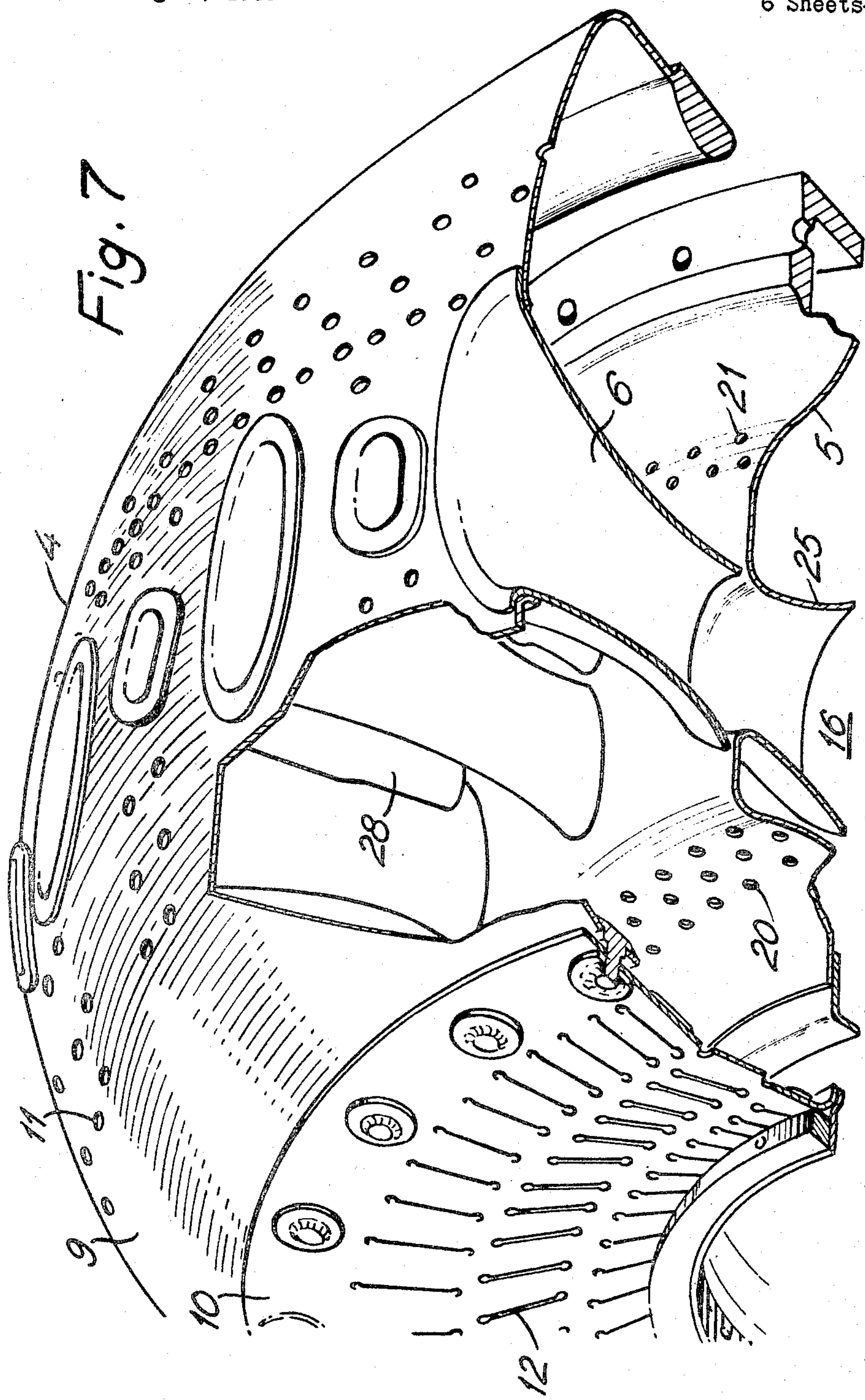
Figure 8:
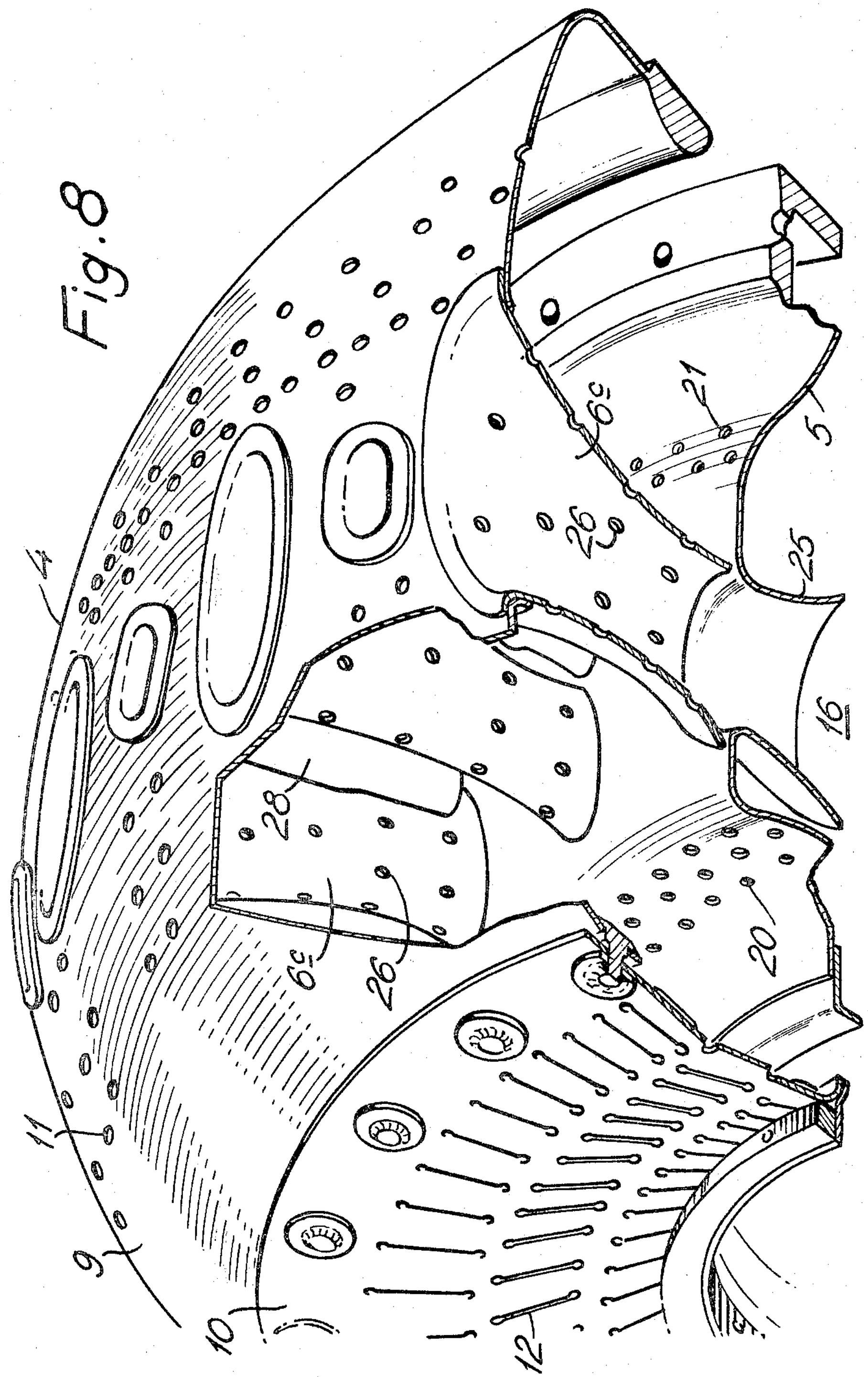

FIGS 6, 7 and 8 clearly show the manner of supplying the inner part of the chamber and of conveying the dilution air. In the example shown in FIG. 6, all the air ducts **6*c* formed with holes 26 for letting through part of the dilution air terminate at the inner wall 5 and supply the internal cavity 16 thereof. In the alternative embodiment of FIG. 7, the air required for the internal cavity 16 of inner wall 5 is led through air ducts 6 devoid of holes with the dilution air reaching the chamber through ducts 28 which open between the outer and inner walls 4 and 5. In this latter form of embodiment holes 26 may likewise be provided on the ducts 6*c***, as shown in FIG. 8.

Figure 9:
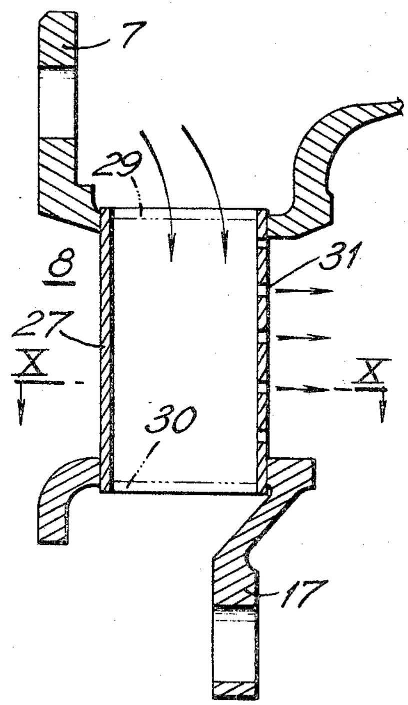
FIG. 9 is a radial section through the set of guide vanes (hereinafter referred to as the distributor) and one of the hollow vanes thereof.
Figure 11:
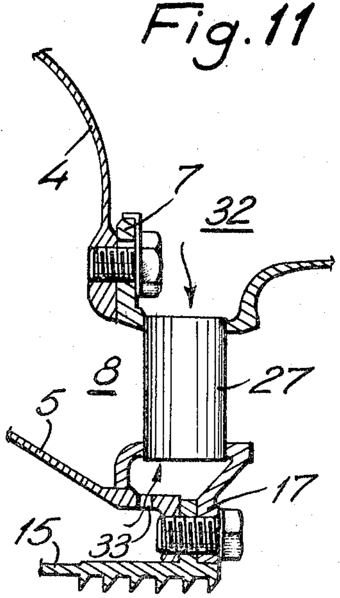
FIG. 11 shows the manner in which the hollow distributor vanes are supplied.
Figure 10:
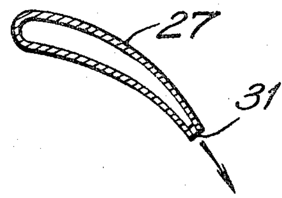
FIG. 10 is a section taken on the line X—X of FIG. 9.

With such an arrangement, the vanes 27 of turbine distributor 8 (see FIGS. 9 and 10), through which air for supplying the combustion chamber through its inner wall is no longer caused to flow, are shortened to a marked extent and may therefore be solid and hence easy to fabricate. Should it prove necessary to cool them, however, they may be made hollow, entirely open, or closed at one end by a wall 29 or 30 and be formed at their trailing edges or at any other suitable place with calibrated holes 31 to permit circulation of the cooling air. In the case of fully open vanes, the latter may be supplied from the space 32 included between the turbine casing 1 and the outer wall 4, and also from the cavity 16 bounded by the inner wall 5, through holes 33 formed therein.

When the hollow vanes 27 of distributor 8 are entirely open and supplied from the space 32 through the holes 33, the inner cross-section of the vanes may be reduced to half that required when the vanes are supplied with cooling air from one end only.

Air circulation through a combustion chamber according to the invention takes place as follows (see FIGS. 1 and 2):

The air issuing from the compresor 2 (irrespective of its type) reaches the space 32 included between the turbine casing 1 and the outer wall 4 of the combustion chamber, bathing the same completely, and then divides into several streams, some of which contribute to combustion, the others to dilution.

On the one hand, a small amount of the combustion air enters the chamber beneath the lips of the labyrinth seals 34 and 35 to feed the base of the flame and ensure flame-holding about the injection wheel 23; a further amount of combustion air enters the chamber firstly through the slots 12 and holes 11 in the swirl plate 10 and the mixer 9 of outer wall 4, and secondly after it has flowed through the air ducts 6 and the holes 20 of swirl plate 18 of inner wall 5.

Dilution air enters the chamber either through the holes 26 of air ducts **6*c* feeding the inner wall cavity (in the case of the first form of embodiment), or through the dilution air ducts 28 (in the case of the second form of embodiment). Complementary dilution air passes through the holes 21 and 13** of the inner and outer walls.

Lastly, a small amount of the air issuing from compressor 2 through the space 32, through the orifices 33, or through both at once, flows directly through the vanes 27 of turbine distrubutor 8 and is ultimately discharged into the air stream ahead of the turbine. Similarly, a small amount of air led between the cavity 16 of inner wall 5 and the labyrinth seal 15 cools the turbine shaft 14 and, after it has flowed through the rear portion of said labyrinth seal, also cools the turbine inlet disc.

It is to be noted that in the combustion chambers of the various forms of embodiment hereinbefore disclosed, due to the fact that the turbine guide vanes may be either solid, or else hollow and be cooled in that case solely by a small air stream, such combustion chambers may be considerably longer than conventional ones in which the hollow guide vanes for the turbine have flowing therethrough not only the air for supplying the chamber through the inner wall but also their own cooling air. This is clearly revealed in FIG. 1 by the dot-dash lines outlining such a conventional chamber. This results in improved gas dilution and in a more judicious temperature distribution ahead of the turbine.

What I claim is:

1. A rotary fuel injection type annular combustion device particularly of the L-shaped kind as used in a gas-turbine engine, having a casing positioned between the compressor and the turbine, an external wall and an internal wall in said casing bounding a combustion chamber having combustion and dilution regions, said internal wall defining an interval cavity therein, said walls being provided with holes for admitting gas dilution air therebetween, and radial air ducts extending from the external wall and opening in front of corresponding holes in said internal wall for feeding said combustion chamber with air via said internal cavity and the other of said holes in said internal wall, the improvement according to which said radial air ducts are of decreasing cross-section from their entrance at the external wall, and diffusers on said internal wall fixedly surrounding the holes therein facing said ducts, said diffusers extending radially inwards of said internal wall into said cavity defined thereby.

2. A combustion chamber according to claim 1, wherein each diffuser has an end cross-section substantially equal to the cross-section of the associated radial air duct at the entrance thereof.

3. A combustion chamber according to claim 1, wherein said radial air ducts are of elliptical cross-section.

4. A combustion chamber according to claim 2, wherein said radial air ducts are of frusto-conical shape.

5. A combustion chamber according to claim 2, wherein said radial air ducts are of venturi-shape.

6. A combustion chamber according to claim 1, wherein said radial air ducts are provided with holes for admitting gas dilution air.

7. A combustion chamber according to claim 1, wherein said radial air ducts, in cold state, have a length less than that between the external and internal walls to provide a small clearance between the internal wall and the ends of the ducts thereby allowing expansion.

References Cited by the Examiner

UNITED STATES PATENTS

| | | | |
|---|---|---|---|
| 2,721,445 | 10/1955 | Gilberty. | |
| 2,856,755 | 10/1958 | Szydlowski | 60—39.36 |
| 3,011,311 | 12/1961 | Williams | 60—39.36 |

MARK NEWMAN, *Primary Examiner.*

RALPH D. BLAKESLEE, *Examiner.*